A. L. HARRINGTON.
COLLAPSIBLE FUNNEL.
APPLICATION FILED APR. 25, 1910.
987,360.
Patented Mar. 21, 1911.
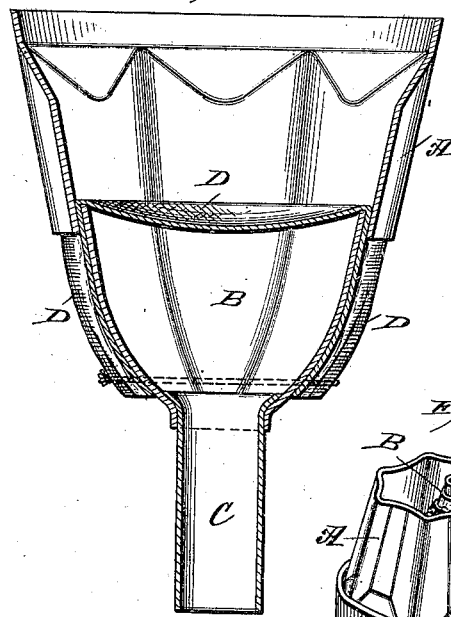
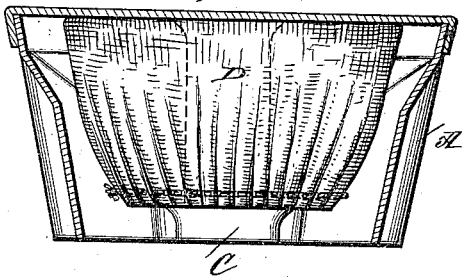
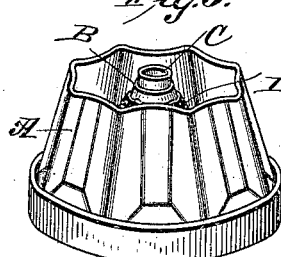
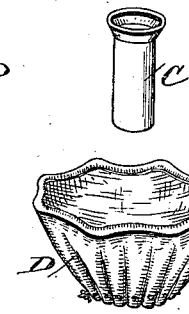
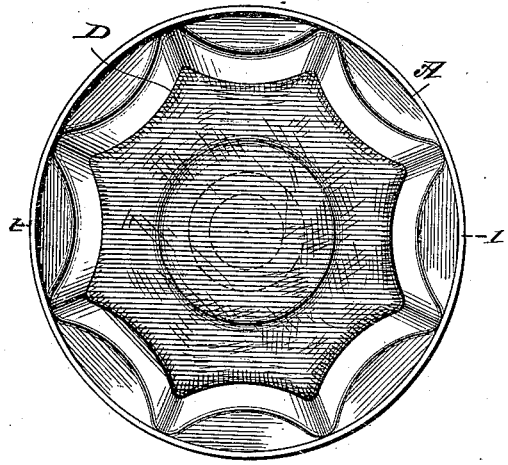
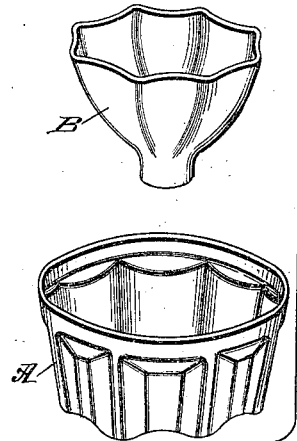
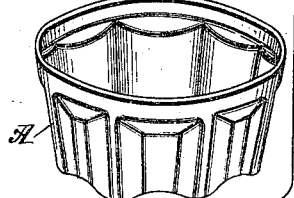
WITNESSES:
E. M. Callaghan
Amos W. Hart
INVENTOR
ALBERT L. HARRINGTON
BY Munn & Co.
ATTORNEYS

UNITED STATES PATENT OFFICE.

ALBERT L. HARRINGTON, OF HOOKER, OKLAHOMA, ASSIGNOR TO CHARLES F. FAUPEL, OF CHICAGO, ILLINOIS.

COLLAPSIBLE FUNNEL.

987,360. Specification of Letters Patent. Patented Mar. 21, 1911.

Application filed April 25, 1910. Serial No. 557,623.

*To all whom it may concern:*

Be it known that I, ALBERT L. HARRINGTON, a citizen of the United States, and a resident of Hooker, in the county of Texas and State of Oklahoma, have invented a Collapsible Funnel, of which the following is a specification.

My invention is an improvement in collapsible funnels adapted for conducting various materials, the same being formed of telescopic parts or members, so that it may be adjusted to occupy minimum space for convenience of storage or transportation. The funnel is provided with an attachment in the form of a skin or fabric suitable for filtering liquids, whereby the funnel is particularly adapted for use in straining gasolene or other liquid hydrocarbon used in motor vehicles.

The details of construction, arrangement, and combination of parts are as hereinafter described and illustrated in the accompanying drawing, in which—

Figure 1 is a longitudinal section of the funnel including the straining or filtering attachment. Fig. 2 is a plan view of the same. Fig. 3 is a sectional view showing the position of the several parts when collapsed or telescoped. Fig. 4 includes perspective views of the several parts of the funnel disassociated or detached from each other. Fig. 5 is a perspective view of the funnel collapsed as when not in use.

A indicates the hollow conical or tapered and truncated body of the funnel, B a smaller conical truncated part adapted to fit in and depend from the part A, while C is a cylindrical discharge tube adapted to depend from the part B. It will be seen that the upper ends of the parts B, C, are flared to such an extent that they are of greater diameter than the lower ends of the parts from which they depend, yet the part C slides easily into the cone B, and the latter in turn slides easily into the part A so that all may be telescoped as shown in Figs. 3 and 5, and thus occupy minimum space. These parts may be constructed of any suitable material, preferably sheet metal.

The funnnel is particularly adapted and intended for use in filtering or straining gasolene employed in automobiles, and for this purpose a circular piece D of chamois skin, which is easily permeable to thin volatile liquids such as gasolene, is applied over the top of the smaller cone B, as shown in Fig. 1, while its rim or outer portion is folded down over the cone, a portion of it being thus compressed between the parts A and B, while the outer or rim portion extends down on the cone B and is secured around the reduced portion of the same by a draw-string. The chamois D thus forms a filtering diaphragm or strainer located in the lower portion of the truncated body A. In practice it is preferably "bagged" or depressed somewhat into the cone B, in order to form a cup-like depression to receive the gasolene or other liquid to be strained. The lower portion of the strainer D is necessarily puckered or crimped in folding it around the contracted end of the cone B, as shown in Fig. 4.

The parts A, B, constituting the body of the cover are represented as corrugated lengthwise, which has the effect of producing greater rigidity; but, for other reasons, I preferably make them smooth or circular in cross section.

By the construction and combination of parts above described, I produce a funnel which is adapted to be telescoped or collapsed and thus occupy small space, which may be quickly extended and arranged for use, and which may be employed for straining or filtering when occasion requires.

What I claim is:—

1. The improved collapsible funnel comprising tapered, hollow, conical, truncated parts A, B, one adapted to fit into and depend from the other, and a filtering medium formed of flexible material which is applied over the mouth of the smaller truncated part and extends down on the outer side of the same, so that when the funnel is extended, as required for use, the side portions of the filtering material are compressed between the said parts and thus held firmly, as shown and described.

2. The improved collapsible funnel comprising hollow tapered truncated parts A, B, the latter fitted within and depending from the other, a straining or filtering diaphragm formed of thin flexible material applied over the mouth of the smaller truncated part and compressed between it and the part A and tied around the lower reduced portion of part B, as shown and described.

ALBERT L. HARRINGTON.

Witnesses:
CLAIRE MOORE,
JOE FOGARTY.

Copies of this patent may be obtained for five cents each, by addressing the "Commissioner of Patents, Washington, D. C."